United States Patent
Fujiwara

[19]
[11] Patent Number: 5,915,211
[45] Date of Patent: Jun. 22, 1999

[54] RADIO CONFERENCE SYSTEM AND TERMINAL UNIT THEREFOR

[75] Inventor: Ryuhei Fujiwara, Tokyo, Japan

[73] Assignee: NEC Corporation, Tokyo, Japan

[21] Appl. No.: 08/887,079

[22] Filed: Jul. 2, 1997

[30] Foreign Application Priority Data

Jul. 4, 1996 [JP] Japan ................................. 8-174498

[51] Int. Cl.⁶ .................................................. H04Q 9/00
[52] U.S. Cl. ........................ 455/67.1; 455/63; 455/67.3; 455/423
[58] Field of Search ............... 340/539, 825.06–825.13, 340/825.54, 825.44; 455/63, 67.1, 67.3, 423, 416; 371/5.1, 5.3, 32, 33; 395/185.07, 182.04, 185.01, 185.1, 182.16, 185.02

[56] References Cited

U.S. PATENT DOCUMENTS

| | | | |
|---|---|---|---|
| 4,584,684 | 4/1986 | Nagasawa et al. | 371/33 |
| 4,751,633 | 6/1988 | Henn et al. | 364/431.12 |
| 5,163,055 | 11/1992 | Lee et al. | 371/32 |
| 5,664,091 | 9/1997 | Keen | 395/182.16 |

FOREIGN PATENT DOCUMENTS 4-364641   12/1992   Japan .
6-284115   10/1994   Japan .

*Primary Examiner*—Donnie L. Crosland
*Attorney, Agent, or Firm*—Foley & Lardner

[57] ABSTRACT

In a radio conference system of the present invention, a hub station 1 sends information to a plurality of terminal stations 2 while adding an error checking code thereto. The terminal stations 2 each sends, on detecting an error out of the information received from the hub station 1, a resend request signal including an ID (Identification) code assigned to the terminal station. The hub station 1 counts the number of times of receipt of the resend request signal on a terminal station basis. When the number of the resend request signals received from any one of the terminal stations 2 exceeds a preselected value, the hub station 1 displays alarm information indicative of the above terminal station.

6 Claims, 4 Drawing Sheets

RADIO CONFERENCE SYSTEM AND TERMINAL UNIT THEREFOR

BACKGROUND OF THE INVENTION

The present invention relates to a radio conference system in which a hub station and a plurality of terminal stations interchange data with each other and, more particularly, to a terminal unit guiding technology for insuring a high transmission efficiency between the terminal stations and the hub station.

Some different transmission protocols have been proposed for a radio conference system in order to implement sure communication and high transmission efficiency between a single hub station and a plurality of terminal stations. For example, a polling system allows a hub station to send data to terminal stations and then confirm receipt terminal station by terminal station. Another system allows the individual terminal station to detect an error out of data received from a hub station and return a resend request signal (NAK) to the hub station. Further, a receipt terminal may include a display for displaying communication quality between it and a hub station in terms of a receipt electric field strength.

However, the conventional schemes described above each has some problems left unsolved, as follows. Although sure transmission is expected with the polling system, polling wastes time when it comes to a conference system in which radio communication is used at a visible distance. Specifically, this kind of conference system does not need strict confirmation of transmission and receipt because most terminal stations are given acceptable communication quality. Therefore, causing all the terminal stations to acknowledge receipt by polling needs an extra period of time and lowers the data transfer efficiency.

The NAK scheme saves the above station-by-station polling time by determining that a terminal station having returned no NAK signals within a preselected period of time has received data correctly. However, the problem with the NAK scheme is that when any one of many terminal stations is put in a low wave propagation condition, the hub station repeats resending exclusively for such a terminal station. Therefore, the hub station cannot send the next data to the terminal stations until it ends the resending operation meant for the terminal station in question, i.e., until it sends the data to all the terminal stations. As a result, if at least one of the terminal stations is of low propagation quality, the overall transmission efficiency of the system falls.

The display scheme capable of displaying the receipt electric field allows each terminal unit to be moved to a location where the wave propagation quality is relatively high in accordance with the display. Such mobility of the terminal unit increases the overall data transfer efficiency of the entire system. However, it is not easy even for an expert in the radio communications art to determine the degree of the receipt electric field strength which insures error-free data transmission. Moreover, in the case of packet transmission, the measurement of the electric field strength itself is sometimes difficult because the hub station does not always send an electromagnetic wave continuously.

SUMMARY OF THE INVENTION

It is therefore an object of the present invention to provide a radio conference system capable of guiding the participants of a radio conference and carrying terminal stations to adequate locations in relation to a hub station, and thereby enhancing the efficient data distribution from the hub station to the terminal stations.

In accordance with the present invention, a radio conference system has a hub station and a plurality of terminal stations each being capable of receiving data from the hub station. The hub station includes a distributing section for distributing information consisting of data and an error checking code to the terminal stations, a resending section for identifying, on receiving a resend request signal from any one of the terminal stations, the terminal station sent the resend request signal, and then resending the information, a plurality of counters respectively assigned to the terminal stations each for counting the resend request signals received from the terminal station associated therewith, and an alarming section for displaying alarm information indicative of the terminal station associated with the counter whose count has exceeded a preselected count. The terminal units each includes a detecting section for detecting an error out of the information sent from the hub station, and a resend request sending section for sending, when the detecting section detects an error, the resend request signal including identification information identifying the terminal station.

In the above system, a chairman operating the hub station can urge a participant carrying the displayed terminal station to move to a location where the wave receipt condition is better. As a result, the frequency of generation of the resend request signal is successfully reduced, and the overall transmission efficiency of the system is enhanced.

Further, in accordance with the present invention, a radio conference system also has a hub station, and a plurality of terminal stations each being capable of receiving information from the hub station. The hub station includes a distributing section for distributing information consisting of data and an error checking code to the terminal stations, and a resending section for resending the information on receiving a resend request signal from any one of the terminal stations. The terminal stations each includes a detecting section for detecting an error out of the information received from the hub station, a resend request sending section for sending, when the detecting section detects an error, the resend request signal including identification information identifying the terminal station, a counter for counting the resent request signals sent, and an alarming section for displaying alarm information showing that a count of the counter has exceeded a preselected count.

In the above system, a participant holding the terminal station with the alarm information can move to a location of better wave receipt condition spontaneously. This also lowers the frequency of generation of the resend request signal and thereby enhances the overall transmission efficiency of the system.

BRIEF DESCRIPTION OF THE DRAWINGS

The above and other objects, features and advantages of the present invention will become apparent from the following detailed description taken with the accompanying drawings in which.

DETAILED DESCRIPTION OF THE PREFERRED EMBODIMENT

Figure 1:
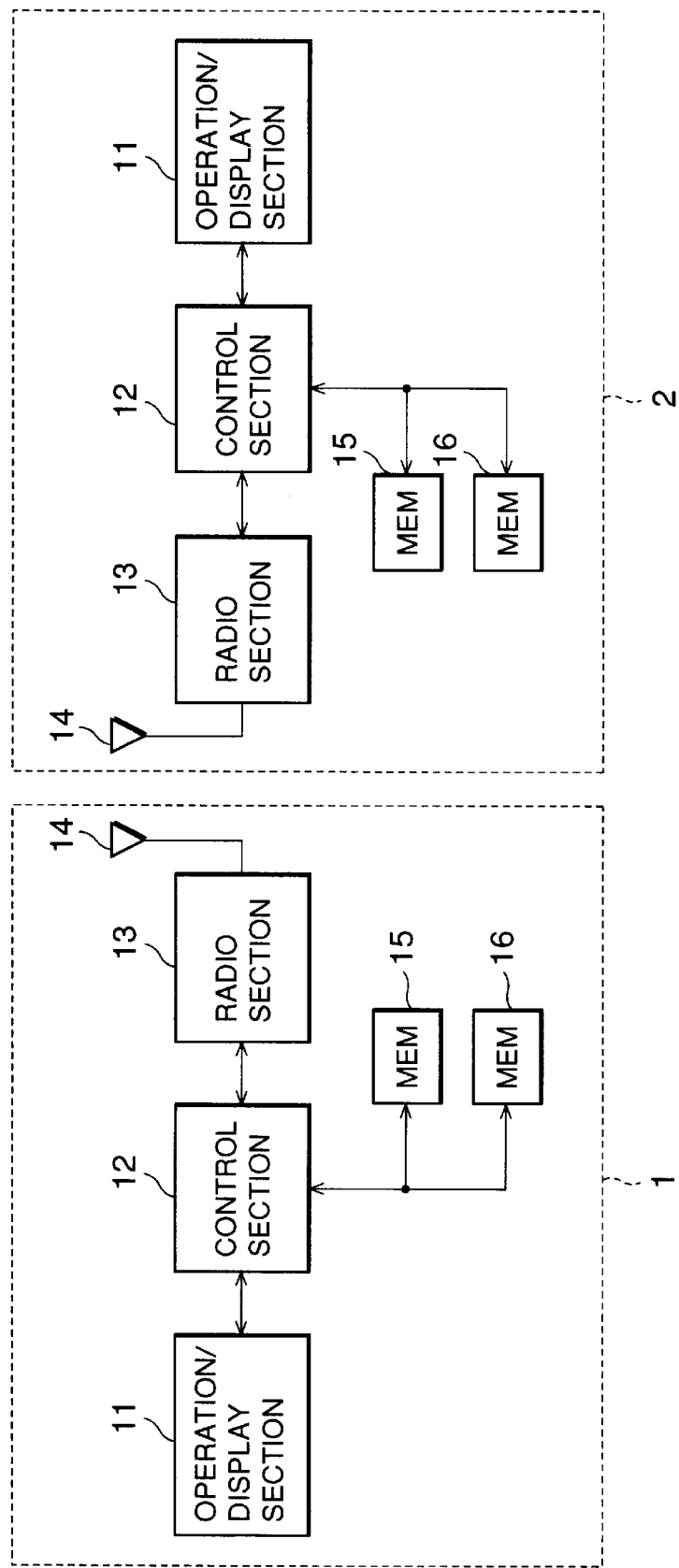
FIG. 1 is a block diagram schematically showing a radio conference system embodying the present invention.

Referring to FIG. 1 of the drawings, a radio conference system embodying the present invention is shown and includes a hub station 1 and a terminal station 2. As shown, the hub station 1 and terminal station 2 are identical in configuration, i.e., they are identical terminal units. One of the two terminal units 1 and 2 held by the chairman of a conference plays the role of a hub station while the other terminal unit held by a participant plays the role of the terminal station. In this sense, the distinction between the hub station and the terminal station is only a matter of convenience.

The hub station 1 includes an operation/display section 11 for allowing data necessary for the terminal itself to be input thereon, while displaying received data. A radio section 13 sends data or receives data via an antenna 14. A first memory (MEM) 15 stores data to be sent or data received from another terminal unit for a moment. A second memory (MEM) 16 stores data for estimating the receiving states of terminal stations. A control section 12 executes control which will be described. The terminal station 2 has the same construction as the hub station 1, as mentioned earlier.

A single hub station 1 is selected by the chairman of a conference on the operation/display section 1. The control section 12 of the terminal unit to play the role of the hub station causes the terminal unit to operate in a hub station mode and causes each of the other terminal units to operate in a terminal station mode.

The terminal station 2 is a portable unit carried by the participant of a conference; in practice, a plurality of terminal stations are each held by one of a plurality of participants. While the chairman and participants are generally positioned within earshot, the range of earshot may not coincide with the range of propagation of an electromagnetic wave, depending on the conditions of a conference room or the ability of a radio system used for a conference.

Figure 2:
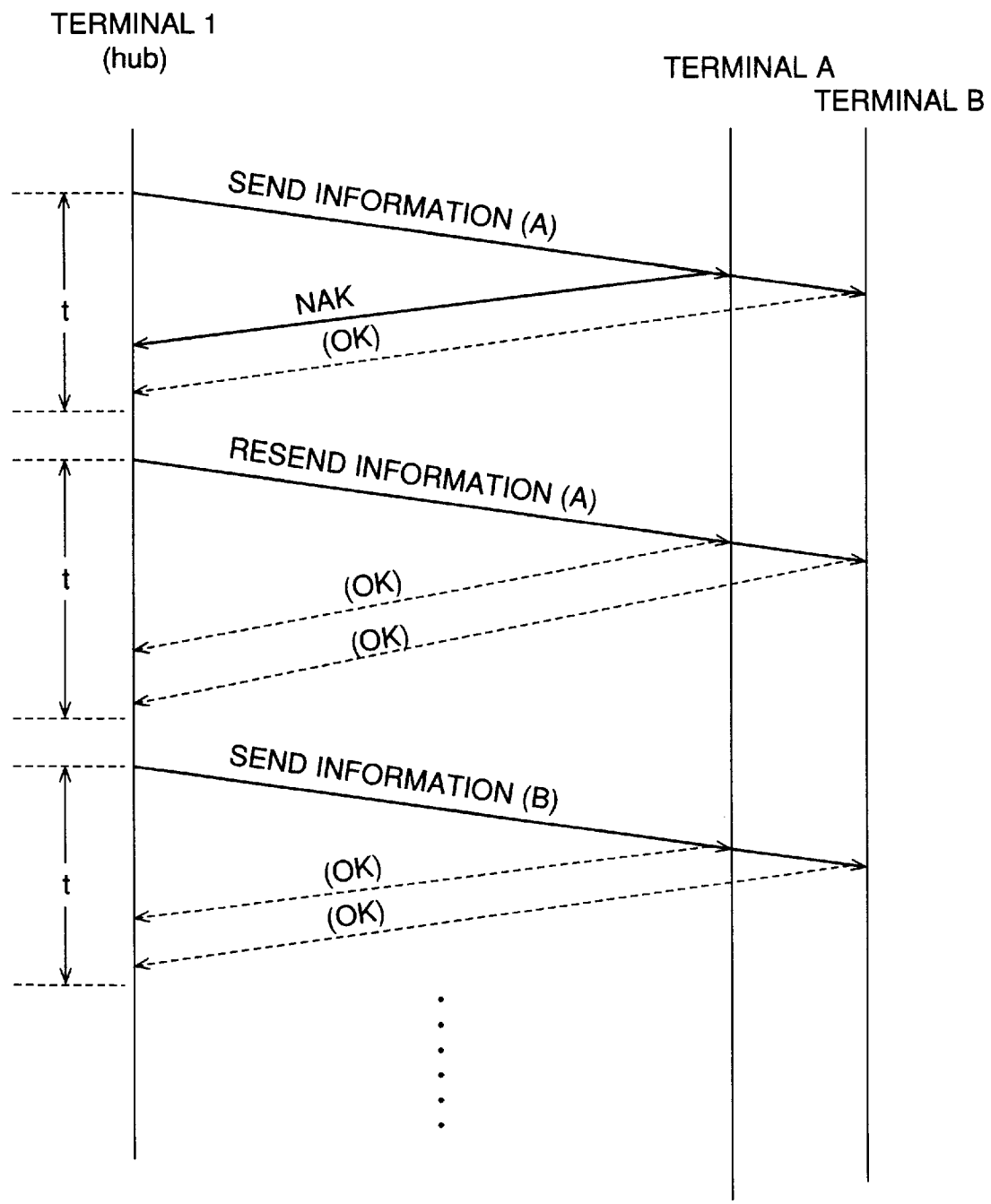
FIG. 2 is a chart representative of a specific signal interchange sequence between a hub station and terminal stations.

FIG. 2 demonstrates resend control particular to radio transmission which allows identical information to be sent to a plurality of terminal stations at the same time. The control section 12 of the hub station 1 divides information to be distributed and stored in the memory 15 beforehand into a plurality of blocks, adds a CRC (Cyclic Redundancy Check) or similar error checking code to each block of information, and then broadcasts the information via the radio section 13 and antenna 14 block by block.

FIG. 2 shows the resend control beginning with the step of broadcasting information a as a single transmission block. As shown, terminal stations A and B (representative of a plurality of terminal stations) each receives one block of information from the hub station or terminal 1. In response, the terminal stations A and B each causes its control section 12 to determine whether or not a transmission error has occurred in the received information a on the basis of the CRC code. If the information a is free from errors, the terminal station A or B writes the information in the MEM 15 and then waits for the next block of data from the hub station 1. At this instant, the terminal station A or B that received the error-free information does not inform the hub station 1 of the receipt of the correct information, as indicated by a dashed line (OK) in FIG. 2. This is because the probability of error-free transmission is high with a conference system in which a number of terminal stations gather in the same environment of relatively high wave propagation quality; returning an acknowledgement each time would simply waste time. However, when a control section 12 detect an error in the received information, the terminal station A or B including that control section 12 returns a NAK signal to the hub station 1 until it receives the information correctly.

In FIG. 2, it is assumed that the terminal station A has detected an error in the received information a and returned the NAK signal while the terminal station B has received the information a correctly. On receiving the NAK signal within a preselected period of time t since the broadcasting of the information a, the hub station 1 again broadcasts the same information a (resending). FIG. 2 shows a condition wherein the terminal station A receives the resent information correctly and therefore does not return the NAK signal, and then the hub station 1 broadcasts the next block of information b on the elapse of the next period of time t. In FIG. 2, both the terminal stations A and B are assumed to receive the information b correctly.

The resending system illustrated in FIG. 2 is a remedy against the temporary disturbance to the propagation of an electromagnetic wave. The problem is that any one of the terminal stations may continuously generate the NAK signal because it is located at a position where the receipt condition is poor; then, the hub station would repeat resending without broadcasting the next information. While this problem may be solved if the number of times of resending is limited, even such an implementation lowers the overall transmission efficiency of the system including many other terminal stations.

The continuous generation of the NAK signal by a certain terminal station means that the wave propagation condition between the terminal station and the hub station is poor. The best solution to the above problem is to, if the terminal station is mobile, cause the terminal station to move to a position of good wave propagation condition. This can be done if the participant carrying the terminal station in question is informed of the continuous generation of the NAK signal and urged to move to an adequate position. Two different procedures for urging the above participant to move to the adequate position will be described hereinafter.

A first procedure is executed by the hub station 1, FIG. 1, as follows. For this procedure, the hub station 1 includes counters each assigned to a particular terminal station. The counters each indicates the number of times of receipt of the NAK signal from the associated terminal station on the basis of a terminal ID code included in the NAK signal. Every time the hub station 1 receives the NAK signal from any one of the terminal stations, it increments the counter assigned to that terminal station by 1 (one). When the counter reaches a preselected value, the hub station 1 displays the ID code assigned to the above terminal unit together with an alarm on the operation/display section 11. At the same time, the hub station 1 may advantageously output an alert in the form of vibration or tone because the chairman may not be watching the display section 11 by accident.

The chairman, watching the alarm appearing on the hub station 1, urges the participant carrying the terminal station in question to move to a position of good wave propagation condition. If desired, the ID codes and the names of the participants may be registered in the hub station 1 beforehand in one-to-one correspondence, so the ID code for alarming can be replaced with the participant's name. After alarming the participant, the hub station 1 causes its control section 12 to reset the counter reached the preselected value. Alternatively, the chairman may reset the counter on the operation/display section 11.

The above control is executed by the control section 12 implemented as, e.g., a microprocessor. A program for the microprocessor is stored in a ROM (Read Only Memory) or similar storage, not shown, beforehand.

Figure 3:
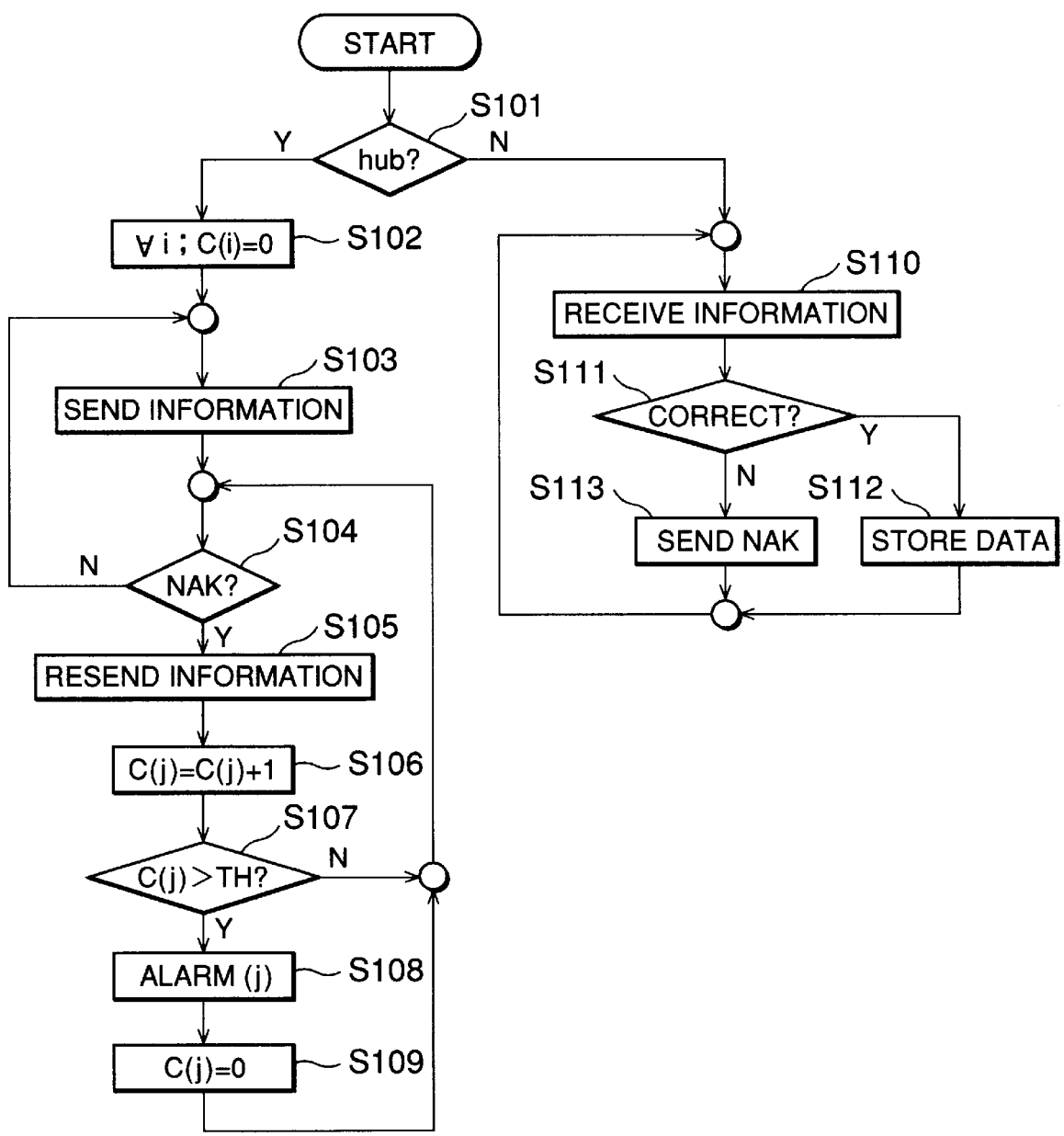
FIG. 3 is a flowchart demonstrating a specific control procedure available with the illustrative embodiment.

The operation of the control section 12 included in the hub station 1 and that of the control section 12 included in each terminal station in accordance with the first procedure will be described more specifically with reference to FIG. 3. The two stations 1 and 2 shown in FIG. 1 can each play the role of a hub station or a terminal station, depending on the operation mode set on the operation/display section 11, as stated earlier. As shown in FIG. 3, the control section 12 of each terminal station 1 or 2 determines whether or not a hub station mode command has been input on the operation/display section 11 (step S101). If the answer of the step S101 is positive (Y), the control section 12 executes a sequence of steps S102 through S109. If the answer of the step S101 is negative (N), meaning that the control section 12 should set up a terminal station mode, it executes a sequence of steps S110 through S112. Consequently, the control section 12 of the hub station 1 executes the steps S102 through S109 while the control section 12 of the terminal station 2 executes the steps S110 through S112.

Specifically, the control section 12 of the hub station 1 resets all the counters C(i) (i=1, 2, . . . , I; I being the number of terminal stations) respectively assigned to the terminal stations (step S102). Then, the control section 12 reads one block of data to be distributed out of the MEM 15, adds a block number, error checking code and so forth to the block, and then delivers them to the radio section 13. The radio section 13 broadcasts the input data to all the terminal stations via the antenna 104 (step S103). Subsequently, the control section 12 determines whether or not the NAK signal has been received from any one of the terminal stations within the period of time t since the transmission of the data (step S104). If the answer of the step S104 is N, the control section 12 returns to the step 103 so as to broadcast the next block of data.

If the answer of the step S104 is Y, the control section 12 of the hub station 1 again causes the radio section 13 to broadcast the same data (step S105), and increments the counter C(j) assigned to the terminal station j sent the NAK signal by 1 (step S106). Then, the control section 12 determines whether or not the count of the counter C(j) has exceeded a preselected threshold TH (step So). If the answer of the step So is negative, the program returns to the step S104 to see if the terminal station j has again sent the NAK signal in response to the resent data or not. When the counter C(j) exceeds the threshold TH (Y, step So), the control section 12 displays an alarm relating to the terminal station j on the operation/display section 11 (step 108). Thereafter, the control section 12 resets the counter C(j) (step 109), returns to the step S104, and then determines whether or not the terminal station has again sent the NAK signal in response to the data resent in the step S105.

On the other hand, the control section 12 of the terminal station 2 receives the data sent from the hub station 1 via the radio section 13 (step S110). The control section 12 neglects the received data if the data is the resent data and if the terminal station 12 has already received the same data correctly. This decision can be done on the basis of the block number included in the receive data. Subsequently, the control section 12 determines, based on the error checking code added to the data, whether or not the received data is correct (step S111). If the answer of the step S111 is Y, the control section 12 writes the received data in the MEM 15 (step S112) and then returns to the step S110 for waiting for the next data. If the received data includes an error, as determined in the step S111, the control section 12 sends the NAK signal to the hub station 1 (step S113) and then returns to the step 110 for waiting for the resending of the data.

A second procedure for urging the participant to move to an adequate position is executed only by the terminal station 2, as follows. Every time the terminal station 2 sends the NAK signal to the hub station 1, it increments a counter d included in the memory 16 by 1. When the counter d reaches a preselected count, the terminal 2 displays an alarm on the operation/display section 11 thereof.

In the second procedure, the participant carrying the terminal unit 2 moves to an adequate position in response to the alarm and then operates the operation/display section 11 for resetting the counter d. Of course, the controller 12 may automatically reset the counter d at the same time as it displays the alarm. In this procedure, the alarm may be implemented by an alert tone or vibration in place of or in combination with the display.

Figure 4:
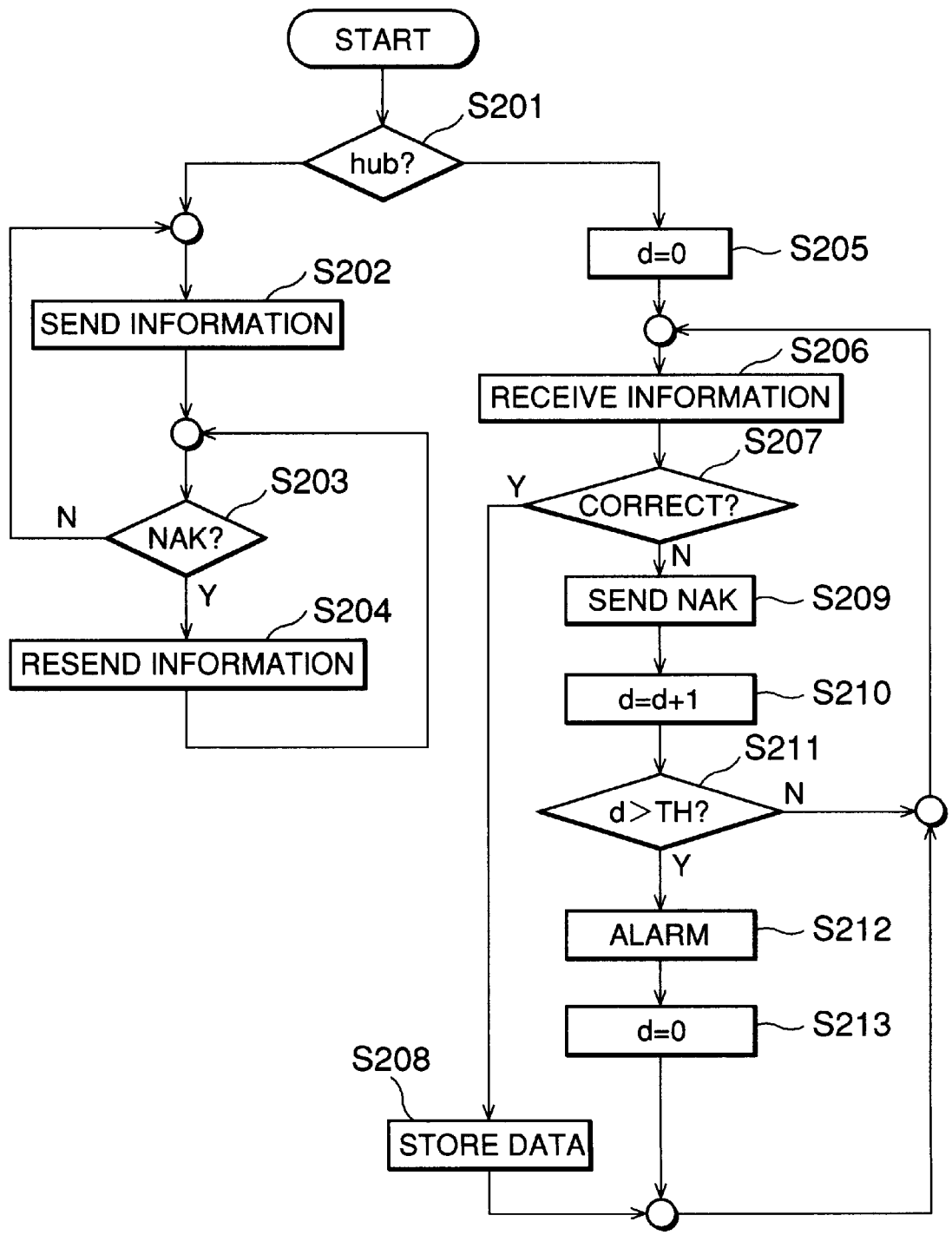
FIG. 4 is a flowchart demonstrating another specific control procedure available with the embodiment.

Reference will be made to FIG. 4 for describing the operation of the control section 12 of the hub station 1 and that of the control section of the terminal station 2 particular to the second procedure. As shown, the control section 12 of the hub station 1 executes steps S202 through S204 while the control section 12 of the terminal station 2 executes steps S205 through S213. As for the hub station 1, the steps S102 through S109 shown in FIG. 3 also occur except for the omission of the steps 102 and S106 through S109, and therefore steps S202 through S204 shown in FIG. 4 will not be described in order to avoid redundancy.

As shown in FIG. 4, the control section 12 included in the terminal station 2 rests the counter d for counting the NAK signals sent to the hub station 1 (step S205). The control section 12 receives the data sent from the hub station 1 via the radio section 13 (step S206). The control section 12 neglects the received data if the data is the resent data and if the terminal station 12 has already received the same data correctly. Subsequently, the control section 12 determines, based on the error checking code added to the received data, whether or not an error exists in the data (step S207). If the answer of the step S207 is Y, the control section 12 writes the received data in the MEM 15 of the terminal unit 2 (step S208) and then returns to the step S206.

If the answer of the step S207 is N, meaning that the received data includes an error, the control section 12 sends the NAK signal to the hub station 1 (step S209) and increments the counter d by 1 (step S210). Then, the control section 12 determines whether or not the counter d has exceeded the threshold TH (step S211). If the answer of the step S211 is N, the control section 12 returns to the step S206. If the answer of the step S211 is Y, the control section 12 displays an alarm on the operation/display section 11 (step S212), resets the counter d (step S213), and then returns to the step S206 for awaiting the resending of the data.

In summary, in accordance with the present invention, a radio conference system gives an alarm to the participant of a conference either directly or via a chairman, urging the participant to move to a position of good wave propagation condition between a terminal station held by the participant and a hub station assigned to the chairman. This prevents the transmission efficiency of the entire system, possibly including many other terminal stations, from being lowered due to a remedy against the defective wave propagation to only a small number of terminal stations.

Modifications of the invention herein disclosed will occur to a person skilled in the art and all such modifications are deemed to be within the scope of the invention as defined by the appended claims.

What is claimed is:

1. A radio conference system comprising:

a hub station; and a plurality of terminal stations each being capable of receiving data from said hub station;

said hub station comprising:

distributing means for distributing information that includes data and an error checking code to said plurality of terminal stations;

resending means for identifying, on receiving a resend request signal from any one of said plurality of terminal stations, the terminal station that sent said resend request signal, and then resending said information;

a plurality of counters respectively assigned to said plurality of terminal stations, each for counting the resend request signals received from the terminal station associated therewith; and alarming means for displaying alarm information indicative of the terminal station associated with the counter whose count has exceeded a preselected count;

said plurality of terminal stations each comprising:

detecting means for detecting an error out of said information sent from said hub station; and resend request sending means for sending, when said detecting means detects an error, said resend request signal including identification information identifying the terminal station.

2. A system as claimed in claim 1, wherein said hub station further comprises resetting means for resetting, when said alarming means displays said alarm information, resetting said counter whose count has exceeded said preselected count.

3. A system as claimed in claim 1, wherein, upon being informed of the alarm information, an operator at said hub station informs, via a communication provided separate from said radio conference system, another operator of the terminal station associated with the counter whose count has exceeded the preselected count to move to a different location.

4. A system as claimed in claim 1, wherein said resending means resends said information and one or more of said plurality of counters is updated upon receipt of one or more resend request signals only if said one or more resend request signals are received within a predetermined time after when said distributing means has distributed said information, and wherein any resend request signals received after said predetermined are ignored.

5. A terminal unit for use in a radio conference system including a hub station and a plurality of terminal stations each being capable of receiving data from said hub station, said terminal unit comprising:

a radio section for selectively transmitting or receiving data;

mode setting means for selectively outputting a hub station mode signal for causing said terminal unit to operate as a hub station or outputting a terminal station mode signal for causing said terminal unit to operate as a terminal station;

a first memory for temporarily storing, when said hub station mode signal is output, data to be sent to said plurality of terminal stations block by block or temporarily storing, when said terminal station mode signal is output, the data received from said hub station;

a second memory for storing, when said hub station mode signal is output, a number of times of receipt of a resend request signal on a terminal station basis; and a control section for transferring, when said hub station mode signal is output, one block of the data temporarily stored in said first memory to said radio section, and causing, on receiving said resend request signal from at least one of said plurality of terminal stations, said radio section to resend said data while updating the number of times of receipt relating to the at least one terminal station, and outputting, when said number of times of receipt exceeds a preselected number of times, alarm information relating to the terminal station exceeded said number of times of receipt; said control section detecting, when said terminal mode signal is output, an error out of said information received from said hub station and sending, on detecting an error, said resend request signal to said hub station.

6. A terminal unit for use in a radio conference system including a hub station and a plurality of terminal stations each being capable of receiving data from said hub station, said terminal unit comprising:

a radio section for selectively transmitting or receiving data;

mode setting means for selectively outputting a hub station mode signal for causing said terminal unit to operate as a hub station or outputting a terminal station mode signal for causing said terminal unit to operate as a terminal station;

a memory for temporarily storing, when said hub station mode signal is output, data to be sent to said plurality of terminal stations block by block or temporarily storing, when said terminal station mode signal is output, the data received from said hub station;

a counter for recording, when said terminal station mode signal is output, a number of times of transmission of a resend request signal; and a control section for transferring, when said hub station mode signal is output, one block of the data temporarily stored in said memory to said radio section, and causing, on receiving said resend request signal from at least one of said plurality of terminal stations, said radio section to resend said data, and detecting, when said terminal mode signal is output, an error out of said information received from said hub station and sending, on detecting an error, said resend request signal to said hub station while updating said counter, and outputting alarm information when the number of times of the resend request signal updated exceeds a preselected number of times.

* * * * *